W. GOLDIE, Jr.
MANUFACTURE OF TIE PLATES.
APPLICATION FILED DEC. 3, 1907.

964,511.

Patented July 19, 1910.
2 SHEETS—SHEET 1.

WITNESSES.

INVENTOR.

W. GOLDIE, Jr.
MANUFACTURE OF TIE PLATES.
APPLICATION FILED DEC. 3, 1907.
964,511.
Patented July 19, 1910.
2 SHEETS—SHEET 2.
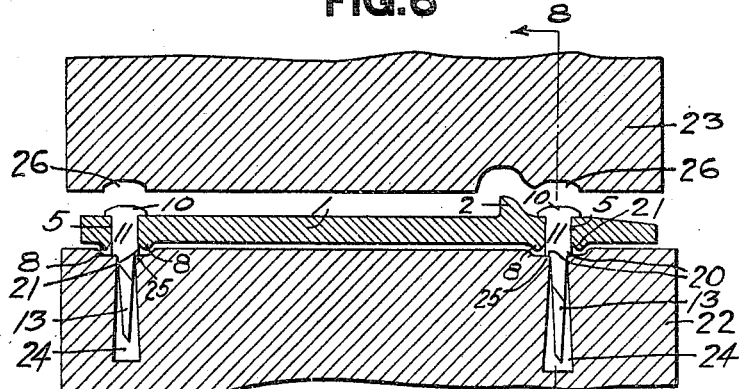
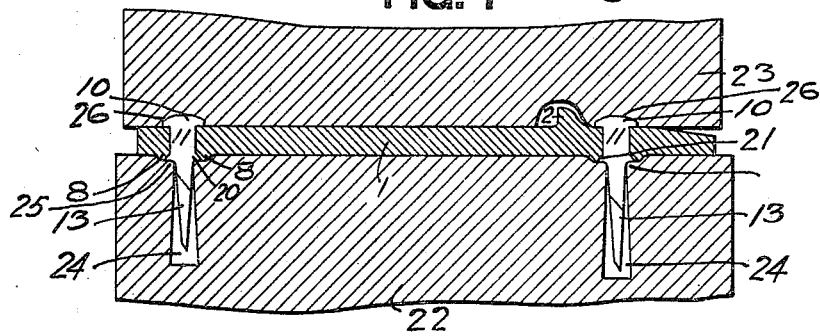
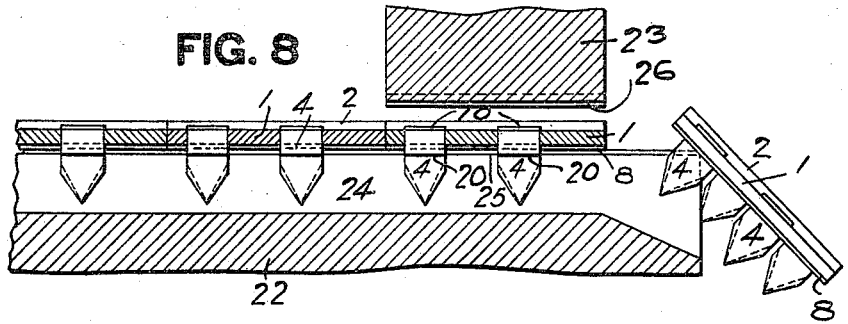
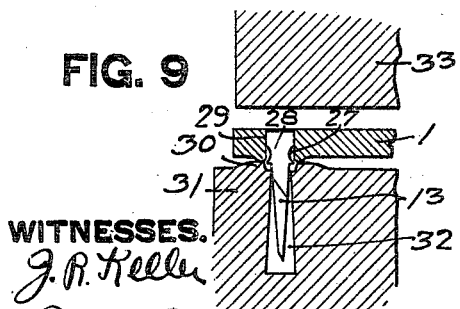
WITNESSES.
J. R. Keller
Robert C. Totten
INVENTOR.
William Goldie Jr.
By Kay Totten & White
attorneys

UNITED STATES PATENT OFFICE.

WILLIAM GOLDIE, JR., OF BAY CITY, MICHIGAN.

MANUFACTURE OF TIE-PLATES.

964,511.

Specification of Letters Patent. Patented July 19, 1910.

Application filed December 3, 1907. Serial No. 404,932.

*To all whom it may concern:*

Be it known that I, WILLIAM GOLDIE, Jr., a resident of Bay City, in the county of Bay and State of Michigan, have invented a new and useful Improvement in Manufacture of Tie-Plates; and I do hereby declare the following to be a full, clear, and exact description thereof.

My invention relates to the manufacture of tie plates, its object being to produce a plate having claws on its lower surface in a cheap and expeditious way.

The particular plate which it is my object to produce is described and claimed in an application filed by me of even date herewith, Serial No. 404,933, and an application filed by me November 12, 1908, for apparatus for making tie plates, Serial No. 462,299.

To these ends, the invention consists, generally stated, in providing a tie plate with a suitable slot, inserting separate claws in the slot and riveting longitudinally of the faces of the claws within the slot by passing the plates between an anvil and a reciprocating die, the claws fitting within a suitable longitudinal groove formed within one of said members.

It also consists of certain other improvements, as hereinafter described and claimed.

Figure 1:
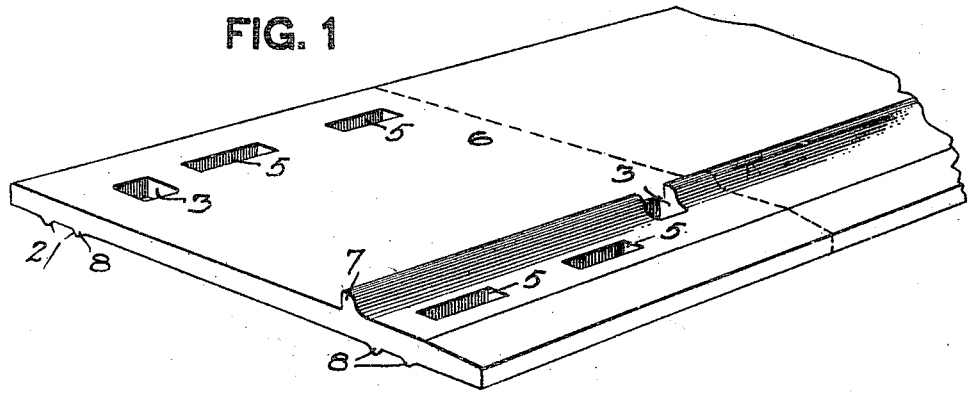
Figure 2:
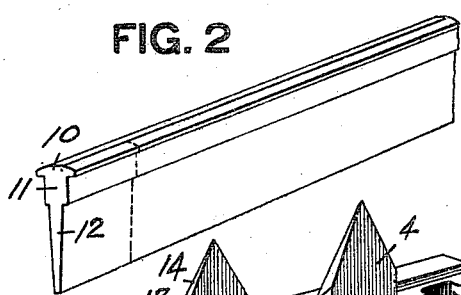
Figure 3:
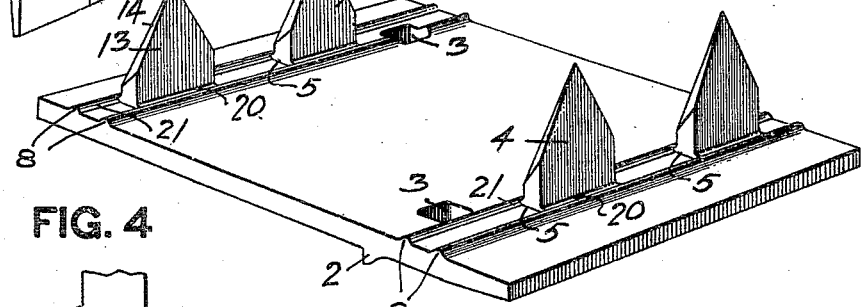
Figure 4:
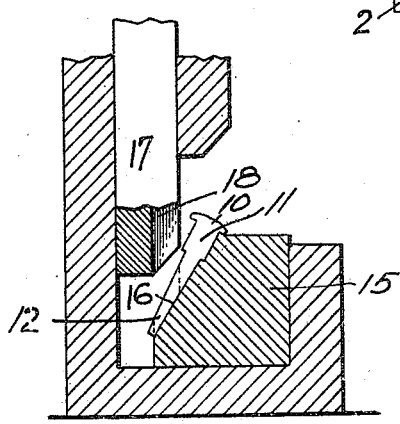
Figure 5:
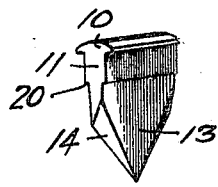

In the accompanying drawing Figure 1 is a perspective view of the rolled plate bar illustrating the shearing and punching in forming plates therefrom; Fig. 2 is a perspective view of the bar from which the claws are formed; Fig. 3 is a view of the finished plate in inverted position; Fig. 4 is a view of the preferred means for sharpening the claws cut from the bars of Fig. 2, and Fig. 5 is a view of the finished claw produced and before inserted in the plate; Fig. 6 is a view of the riveting mechanism with the rivet head raised; Fig. 7 is a like view with the rivet head lowered; Fig. 8 is a longitudinal section on the line 8—8 Fig. 6; and Figs. 9 and 10 illustrate another form of riveting mechanism.

The claw plates which it is intended to produce by the present invention, though it is not specifically limited to their production, have the body portions 1 with the shoulders 2, spike holes 3 and the claws 4, which claws as illustrated are formed separate and secured within slots 5 formed in the body of the tie plate by riveting the plate and claw body together, such plates being described in detail in the above application, Serial No. 404,933. In their manufacture according to the present invention I roll a suitable plate bar 6, it being preferred that this bar should be formed simply with the upper shoulder 7 on one side thereof to form the shoulder 2 of the tie plate, the lower surface of the bar being flat, or simply having the slight V-shaped ribs 8 which register with the slots 5 formed to receive the claws 4 and form flaring mouths to the slots 5 to facilitate riveting at the bases of the slots as hereinafter set forth. These plates can be produced at very low cost and very rapidly on account of the simple character of the rolling operation. After the rolling of the plates, to prepare them for receiving the claws, they are sheared to length and punched, this being accomplished by any suitable machinery, the result of shearing and punching being indicated on the bar of Fig. 1, the regular spike holes 3 being punched in the plate as well as the slots 5 to receive the claws 4.
The above is the simplest way to produce the plates though they may be produced in any suitable way.

To produce the claws used with the plates I roll a bar of any suitable section, for example, the bar shown in Fig. 2 having the head 10, the relatively thick body portion 11 of a length slightly greater than the thickness of the plate so as to provide metal below the plate for riveting. Beyond said thick portion is the thinner claw portion 12 for forming the projecting claw 4 on the plate. In the preferred working these bars are cut to suitable length and are sharpened any suitable way before being secured within the tie plate body. For this purpose I prefer to shear the same diagonally and in the direction of the length of the point portion, shearing the blanks so as to provide V-shaped points 13 with the inclined faces 14 in front of the same. Suitable apparatus for so shearing the claws is illustrated in Fig. 4, the claw being placed upon the inclined anvil die 15 having the shearing edges 16, and the reciprocating shearing die 17 with the V-shaped shearing recess 18 shearing obliquely through the blank and forming the points 13 and inclined faces 14 on the claws. Such shearing operation provides an exceedingly rapid and efficient way of sharpening the claws as has been proven in connection with spike manufacture and the sharpening of the integral claws on the tie plates. However, by sharpening these claws separately before securing them in the plate a much more perfect cutting edge and greater incline of beveled face can be obtained because there is no overhanging flange to interfere with the stroke of the shearing die in sharpening. While I have described this method of sharpening the claws it is evident that the claws may be sharpened in any suitable way.

The claws are secured within the plates by riveting the plate and claw body together in any suitable way. I have illustrated in Figs. 6 to 8 the simplest and most rapid method of accomplishing this work. As above stated the thick body portion 11 of the claw projects slightly beyond the lower face of the plate forming riveting shoulders 20, 20, and by any suitable tool these projecting shoulders can be upset. In order to provide a recess to receive such metal the slight projecting ribs 8 are formed on the under face of the plate and the slots 9 are punched so as to register with the same so that such rib portions opposite the slots form flaring bases or mouths 21 therefor and so provide space to receive the metal upset in riveting the claws without the weakening of the plates at all at this point. This riveting operation is preferably carried on by means of the grooved anvil 22 and the reciprocating riveting head 23. The anvil 22 has formed in it the deep grooves 24, 24, which are adapted to receive the claw portions 13 of the claws 4, and the upper edges of which form shoulders 25, 25, fitting closely to the upper portion of said claw portions and on which the shouldered bases 20 of the thick body portions 11 of the claws are supported. The reciprocating plunger or riveting head 23 is provided with longitudinal recesses 26, 26, corresponding in shape to the heads 10 of the claws and the said reciprocating head has a stroke adapted to force down the claws and upset the shoulders 20 of the claw body and so secure the claws in the plate. It will be seen that the anvil 22 is of much greater width than the riveting head 23, and can support several plates for riveting.

After the insertion of the claws in the tie plates the plates carrying the same may be fed longitudinally under the reciprocating head, the claws fitting within the grooves 24 of the anvil and under the stroke of the reciprocating head these claws being riveted within the tie plates by the spreading of the lower shoulder portions 20 at the base of the thick body portions 11 of the claws. This riveting operation can be carried on rapidly simply by pushing the plates one after the other longitudinally over the anvil 22 with their claw portions traveling within the grooves 24, the reciprocating riveting head performing the riveting operation no matter what the position of the tie plate may be upon the anvil, and the plates being simply pushed off the anvil at the opposite end, and dropping from the machine in finished condition.

Practically the same means for riveting may be employed no matter what the shape of the claw and the character of the riveting may be. For example, in Figs. 9 and 10 the claw 28 itself is provided with side recesses 27 formed in its thick body portion, and to hold it in place the lower edges of the slot 29 through which the claw projects, can, by like riveting means such as by the ribs 30 formed upon the top face of the anvil 31 on each side and above the groove 32 receiving the prong portion of the claw, by the stroke of the reciprocating head 33 be forced inwardly into said side recesses and so hold the claws within their seats.

By the use of the invention I am thus enabled to produce a tie plate having claws firmly secured therein without the waste of metal which has heretofore occurred where the claws were formed from the integral flanges rolled on the bar, — and am enabled to employ longer claws, and also to locate them in any desired place in the plate; while the rolling, shearing and pointing operations are much simplified, so that a better plate can be produced at much lower cost than where the plates are made with integral claws as has been the practice in this type of tie plate.

What I claim is:

1. The herein described method of making tie plates, consisting in inserting separate claws in separate slots in the body of the plate and passing the plate longitudinally of the faces of the claws progressively between reciprocating dies one of which is grooved to receive the claws and by the action of said dies riveting the plate and claw body together.

2. The herein described method of making tie plates, consisting in inserting a claw having a thick body portion of greater depth than the thickness of the plate within a slot in the plate, and upsetting the thickened portion of the claw above the thin portion thereof and thereby riveting the plate and claw body together.

3. The herein described method of making tie plates, consisting in shearing a separate claw in the direction of its length to sharpen it, and inserting the sharpened claw in a slot in the tie plate, and passing the plate longitudinally of the face of the claw progressively between reciprocating riveting dies one of which is grooved to receive the claw and thereby riveting the plate and claw together above the claw point.

In testimony whereof, I the said WILLIAM GOLDIE Junior have hereunto set my hand.

WILLIAM GOLDIE, JR.

Witnesses:
ROBERT C. TOTTEN,
J. R. KELLER.